Sept. 27, 1966 G. CSANKY 3,275,845

FIELD SWITCHING DEVICE EMPLOYING PUNCHTHROUGH PHENOMENON

Filed Dec. 27, 1962 3 Sheets-Sheet 1

INVENTOR.
Geza Csanky

BY Mueller & Aichele

ATTY'S.

Sept. 27, 1966 G. CSANKY 3,275,845

FIELD SWITCHING DEVICE EMPLOYING PUNCHTHROUGH PHENOMENON

Filed Dec. 27, 1962 3 Sheets-Sheet 2

INVENTOR.
Geza Csanky

BY

[signature]

ATTY'S.

Sept. 27, 1966 | G. CSANKY | 3,275,845

FIELD SWITCHING DEVICE EMPLOYING PUNCHTHROUGH PHENOMENON

Filed Dec. 27, 1962 | 3 Sheets-Sheet 3

INVENTOR.
Geza Csanky

BY

Mueller & Aichele

ATTY'S.

United States Patent Office 3,275,845
Patented Sept. 27, 1966

3,275,845

FIELD SWITCHING DEVICE EMPLOYING PUNCHTHROUGH PHENOMENON

Geza Csanky, Mesa, Ariz., assignor to Motorola, Inc., Chicago, Ill., a corporation of Illinois Filed Dec. 27, 1962, Ser. No. 247,697
7 Claims. (Cl. 307—88.5)

This invention relates generally to semiconductor devices and in particular to semiconductor devices designed for the isolation of input from output signals.

Isolation between input and output signals has not yet been achieved with semiconductor devices. To date it has been a unique property of the mechanical relay and the isolation transformer.

As is well-known, the mechanical relay is widely used in switching applications of many types and large numbers of relays are used in certain types of automatic machines where they function in control circuits. Among the larger users of relays are the telephone companies and in the larger telephone exchanges thousands of relays are used.

In many applications, relays are rapidly being replaced with transistors since relays have several disadvantages in comparison. Relays are often rather large and bulky compared to devices such as transistors and therefore use more space, they may have larger power requirements, are somewhat more sensitive to shock and various environmental conditions, have moving parts which are subject to mechanical failure, and have projected operating lifetimes which are several orders of magnitude shorter than for transistors. Although the replacement of the relay with the transistors is generally desirable, there are some attendant disadvantages. Transistors are usually manufactured to meet a number of specifications, many of which are necessary for simple relay type switching, and this may make their use more expensive than is necessary. Where multicontact relays are replaced with transistors, a simple one to one replacement is not possible; for example, in the case where a relay has six sets of contacts the replacement for this relay is not one transistor but is necessarily at least six transistors, and this may make a replacement of this type rather costly.

The mechanical relay is basically slow to operate due to the fact that it has mechanical parts which must be put into motion and the inertia of these mechanical parts must be overcome; and, of course, it also takes some time to reach the proper magnetic field strength necessary to start this mechanical motion. In some electrical circuits involving relays, for this reason, it may be necessary to incorporate time delay or signal lengthening features into the circuits so that a signal for one relay which is to arrive through the contacts of another relay will not arrive too soon and die out before the relay contacts are closed and the signal can be utilized. The necessity for additional circuitry and components necessary to do this may in some cases add considerable cost to relay circuits. While any of the known relay equivalents such as transistors have finite operating times, it should be apparent that where a signal has a duration of, for example, 0.1 second it will not be greatly affected in passing through a device having a turn on operating time of one microsecond. However, in the case of a relay it may take a tenth of a second or more to close a set of contacts so that for a useful signal current to pass through the contacts it must be of a longer duration than the signal necessary to operate the relay or be delayed until the contacts have been closed. For this reason transistors or electron tubes are often used instead of relays where this problem is important. There are disadvantages in using transistors, some of which were discussed in the preceding paragraph. Electron tubes, of course, require considerable power expenditure; additionally tubes as well as transistors are usually manufactured at some cost to meet a number of parameters, many of which are not necessary to simple relay type operation. In satisfying a relay substitution problem by using either tubes or transistors much more complex circuitry will frequently be necessary. Aside from the problems incured in replacement of relays with transistors and vacuum tubes, the fact of the matter is that in some cases relays cannot be replaced with either the transistor or the vacuum tube. Some applications of relays require the isolation of the input from the output signal and this is not readily achievable with existing electron tubes and transistors.

The fact that complete isolation of the input from the output signal cannot be achieved with transistors or at present with other simiconductor devices is of considerable importance for purposes other than relay type switching. There is considerable need in the field of integrated circuitry for isolated interstage coupling of radios and similar electronic circuitry without relying on conventional transformers because of their relatively large size even when miniaturized. It is rather difficult to make transformer type devices and many other inductor type devices using conventional integrated circuitry fabrication techniques and so a non-inductor approach is desirable.

The tiny wire-wound transformers used in many transistor circuits would be replaced, where weight is a factor, if a functionally equivalent and otherwise suitable device were available for replacing them. These tiny transformers, especially those of the iron-core type, are often relatively expensive.

Accordingly, it is an object of this invention to provide a switching device which may be used as a replacement for a mechanical relay and which is superior to the mechanical relay. It is a further object of this invention to provide a device suitable for switching applications which is less expensive to fabricate or utilize than transistors and/or electron tubes but has the advantages of both. It is yet a further object of this invention to provide a device which is in some applications a transformer equivalent suitable for use in integrated circuitry in miniature circuit applications.

A feature of this invention is the modulation in the device, of the resistance of a channel of semiconductor material of one conductivity type, lying between two opposed regions of opposite conductivity type semiconductor material which form PN junctions with the channel material, by varying the potential differences between the two junctions with respect to each other rather than with respect to the channel.

Another feature of the invention is the use in the device of the well-known punchthrough mechanism between the two opposed junctions to render the channel between essentially non-conductive.

In accordance with this invention it is possible to manufacture semiconductor tetrodes and other multi-electrode semiconductor devices which are equivalent or superior to mechanical relays, and transformers, including also multicoil transformers and isolation transformers. Also in accordance with this invention it is possible to fabricate a variable resistance device suitable for automatic gain control.

The drawings and the following text will explain the invention in more detail.

Figure 1:
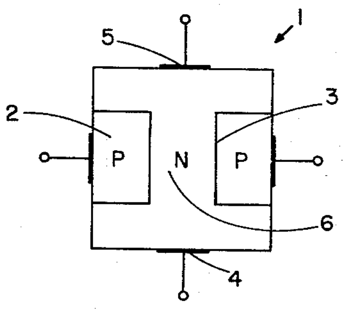
FIG. 1 is a schematic representation showing the structure of the device.
Figure 2:
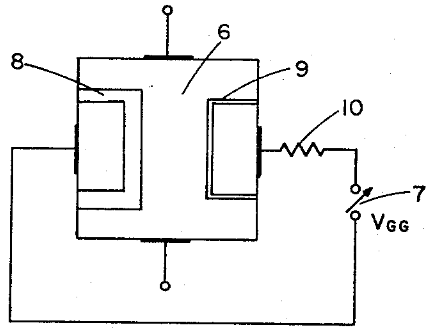
FIG. 2 is a schematic representation of the device with a voltage applied across the junctions and showing the depletion region emanating from one junction.

In FIG. 1 it is apparent that the device 1 is similar to that of the field effect transistor since it has two gate junctions or gates 2 and 3, a source 4 and drain 5, and a channel 6. This similarity is superficial, however, since the device, a tetrode, is different geometrically and operationally from a field effect transistor. In the classical field effect transistor, the current flow through the channel alters the electric field and shapes the depletion region in the channel and at a certain field strength the channel is pinched off and the familiar current limiting phenomenon takes place. In the case of two opposed gates, punchthrough between these gates cannot occur since they are at the same potential since they are connected. After electrical pinch off, a relatively large current compared to ordinary junction reverse current can continue to flow in the field effect device. For a given resistivity, the current flowing through the device is in an inverse relation to the channel length so that, in general, the longer the channel the less current; in the device of this invention, the channel 6 is very short with respect to its thickness and, for practical purposes, the current flowing through the device under a given set of conditions is independent of the channel length since the channel 6 is kept as short as possible. When operated as a relay this device operates due to electrical punchthrough and, as noted, this phenomenon cannot occur in the field effect device due to the fact that the gates are at the same potential. When operated as other than a relay with the gates having a potential difference between, the depletion region from one gate rather than both predominates and controls the effective channel width, and this is illustrated with the aid of FIG. 2. When there is no source 4 to drain 5, current flow across the channel and a variable voltage $V_{GG}$ 7 is connected across the gates 2 and 3, a wide depletion region 8 will occur at one junction and a thin depletion region 9 will occur at the other. This is due to the fact that the voltage division across the two junctions of the tetrode is such that most of it appears across the junction having a lower leakage and only this leakage current, of course, flows through both junctions. The voltage division with respect to the two junctions therefore is determined by this leakage current. With increases in gate voltage, the depletion regions become thicker and the channel thinner and at a certain value of gate voltage punchthrough will occur, effectively closing the channel to current flow. A current limiting resistor 10 is connected in the separate gate circuit to limit the current through the junctions at the punchthrough; this resistor may also be incorporated in the body of the device. The reason for having the low length to thickness ratio to the channel will now become apparent. In the previous case since there was no current flow through the channel, the boundaries of the depletion regions 8 and 9 were essentially plane parallel, and at punchthrough; having completely closed the length of the channel 6, i.e., the whole region between the opposed parallel junctions. However, if the current flows through the channel the attendant voltage drop in the channel region causes a non-uniform electric field to be generated with respect to the channel and gates of this device similar to the one in the channel of the field effect transistor. If this internal field is not avoided or kept at a minimum, it changes the configuration of the boundaries of the depletion layers. Due to this field, the original punchthrough will occur at a lower gate voltage since the depletion region is wider near the drain according to the current flowing in the channel and only part of the channel will be punched through. Thus the resistance of the channel is different and is at a somewhat lower value than it would be if the depletion region were of about the same length as the channel. Obviously, a current insensitive condition can be approximated as the channel length approaches a very small value. The shape of the depletion region is very nearly independent of channel current since in the limiting case of a zero length channel, there is no resistance to current flow and hence no voltage drop across its "length."

The resistivity of a depletion region in silicon is greater than the theoretical maximum bulk resistivity that is possible with silicon. This resistivity is about an order of magnitude greater for the depletion region than it is for silicon. The resistivity of the depletion region is approximately $2.5\times10^6$ ohm-centimeter and the resistivity for intrinsic silicon is $3\times10^5$ ohm-centimeter. With a zero gate voltage, the resistance represented by the channel is relatively low and it is determined by the bulk resistance of the effective channel thickness. At punchthrough, the bulk resistance of the depletion region will be acting and in this case, current flow in the device is a function of both the resistivity of the depletion region and the degree to which the total length of the channel has been closed. This is another reason why the field in the channel due to channel current should be minimized and this is most effectively done by keeping the length of the channel extremely small with respect to the width.

The gate voltage necessary for punchthrough is essentially constant with a short channel and this is an advantage in switching operation. As is obvious, when used as a modulation device or a transformer the gate voltage is always kept less than the punchthrough voltage.

Figure 3:
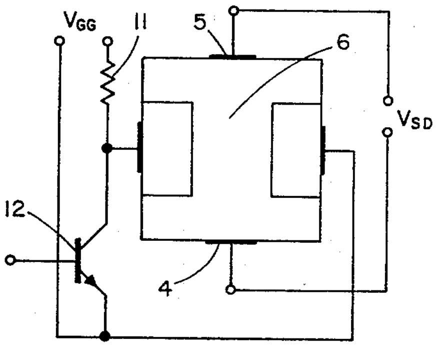
FIG. 3 is a schematic diagram showing the use of a device when operated as a relay.

When the device of FIG. 1 is operated as a relay, switching should be done from a near zero gate voltage to above punchthrough voltage. A circuit performing such an operation is shown in FIG. 3. The resistor 11 is the transistor 12 load resistor and also the current limiting resistor of the gate circuit. When used in this manner the channel will pass A.C. or D.C. current, whenever there is a potential difference $V_{SD}$ between source and drain, the polarity of which is immaterial. The channel is kept closed by the gate voltage $V_{GG}$ which is slightly greater than is required for punchthrough and, of course, little current can get through the channel from source to drain. When a signal is applied to the emitter and base of the transistor allowing current to flow in the transistor, the voltage difference between the two gates falls to a very small value and the depletion region becomes very small, opening the channel and current flows readily through the device from source 4 to drain 5.

Figure 4:
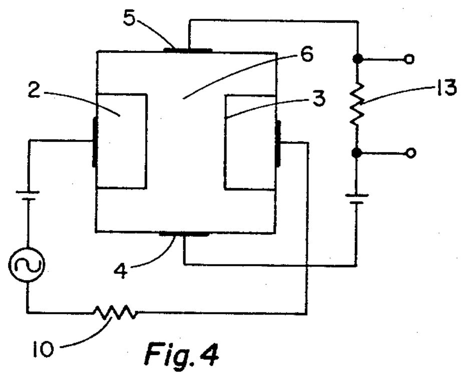
FIG. 4 is a schematic diagram showing employment of the device when operated in a manner analogous to an isolation transformer.

If an A.C. generator is connected across the gate junctions 2 and 3 and a D.C. voltage is applied to the source and drain 4 and 5 as in FIG. 4, an A.C. voltage will appear across the load resistor 13. This, of course, is due to the variations in the channel cross section 6 with changes in the depletion region thicknesses of the gate junctions 2 and 3 as the voltage varies in the gate circuit. This operation is analogous to the use of an isolation transformer, the gate circuit corresponding to the primary circuit of the transformer. Additionally, devices operated in this manner show a voltage gain. The peak A.C. voltage at the gates must be less than the punchthrough voltage when so operated.

Figure 5:
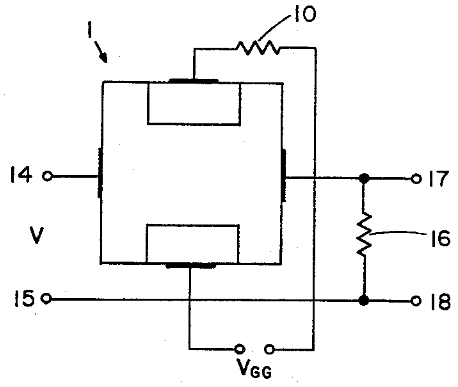
FIG. 5 shows the operation of a device when employed as a potentiometer suitable for automatic gain control.

In FIG. 5, the device is used as a potentiometer. Since the variation of the channel thickness varies the resistance from source to drain when a voltage V is applied across the terminals 14 and 15, the voltage division between the device 1 and the external resistor 16 at the terminals 17 and 18 can be varied by varying the gate voltage $V_{GG}$. A very short channel is not necessary in this application.

Figure 6:
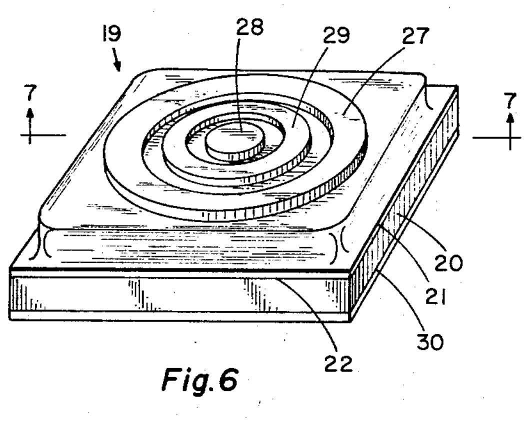
FIG. 6 shows isometrically a possible configuration of a device featuring epitaxial construction and planar configuration.
Figure 7:
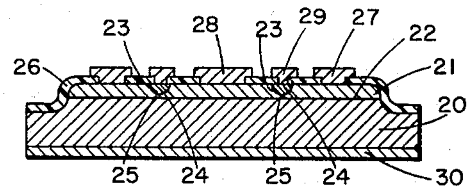
FIG. 7 is a cross sectional view of FIG. 6.

FIG. 6 and its sectional view FIG. 7 show a possible configuration of a device suitable for use as described in the preceding text in reference to FIG. 1 through FIG. 5. The device 19 consists of a wafer 20 or die of p-type semiconductor material such as germanium or silicon on which a layer of N-type semiconductor material 21 has been grown epitaxially forming one of the gate junctions 22. The other junction 23 is formed by selectively diffusing a P region 24 into the N-type epitaxial material and this also forms the channel 25. The junctions are protected by a layer 26 of silicon dioxide or glass which covers the unit 19. Openings in the glass 26 permit electrical connection with aluminum terminals to the source 27 and drain regions 28 and to the upper gate 29. The other gate terminal 30 is also of aluminum and may essentially cover the bottom of the die. The die is mounted and connected to any suitable four lead transistor type header prior to use using conventional transistor assembly techniques.

Figure 8:
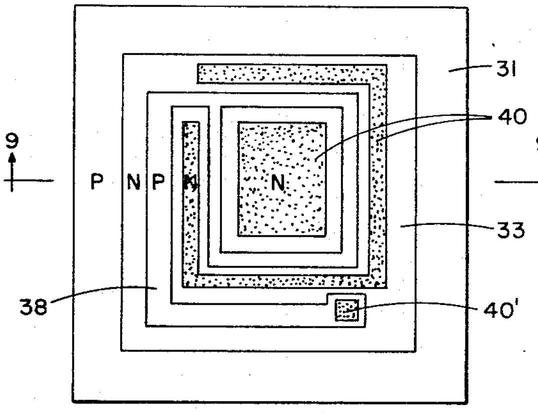
FIG. 8 shows a plan view of the device of FIG. 1 but with an integral gate current limiting resistor.

FIG. 8 is a plan view of a device structurally equivalent to the device of FIG. 1 but with an integral current limiting resistor connected to one of the gates.

Figure 9:
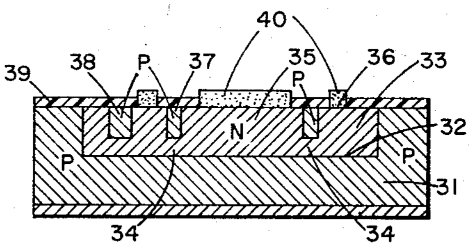
FIG. 9 shows a sectional view of the device of FIGS. 1 and 8 along 9—9 of FIG. 8.

FIG. 9 is a sectional view at 9—9 of FIG. 8. The die 31 itself is of P-type material and forms a gate junction 32 with the adjacent selectively diffused N region 33; the channel of the device 34 lies in this N region 33. This device has a drain 35 and a source 36 at the upper surface. The smaller region of P material is another gate 37 of the device which is formed by diffusion. An appendage to this region is diffused at the same time and forms a current limiting resistor 38 for the gates of the device. A film 39 of silicon dioxide or glass protects the junctions and electrical connection is made to the semiconductor by metallized terminal regions 40 of aluminum at the surfaces of the sources, drains and gates. The metallizing contact 40′ to the diffused P-type upper gate is indirectly connected and is placed on the end portion of another diffused P region 38 which forms a protective current limiting resistor as well as the connection between the contact and the gate.

Figure 10:
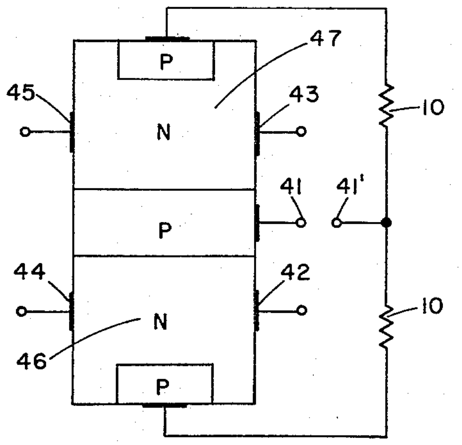
FIG. 10 is a schematic diagram showing the use of a device suitable for replacement of a double contact relay or a double secondary transformer.

FIG. 10 shows schematically the stacking of two devices as in FIG. 1 into a different unit that may be used in the manner of a two contact relay or a two secondary transformer. The signal is applied across the gate circuit terminals 41 and 41′ and each source 42 and 43 to drain 44 and 45 current flow is controlled in the two channels 46 and 47.

Figure 11:
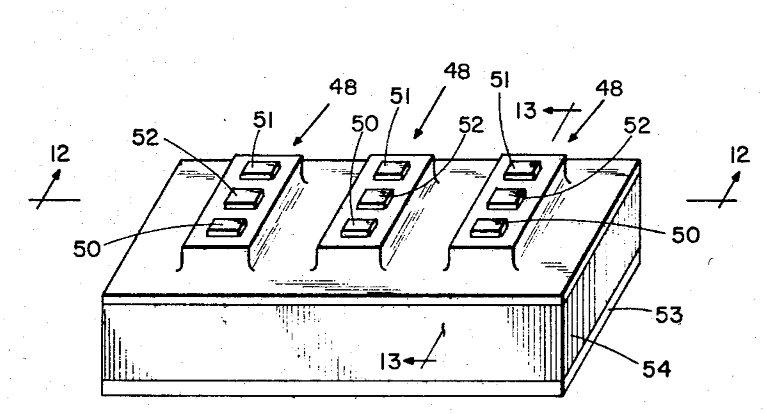
FIG. 11 shows an isometric view of a three channel device.
Figure 12:
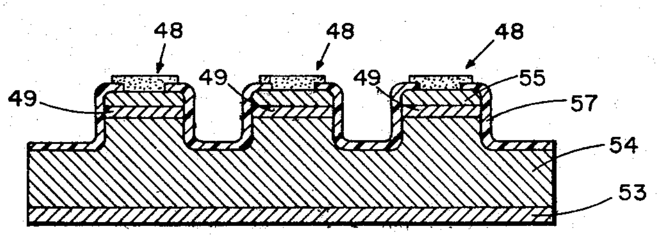
FIG. 12 shows a sectional view of FIG. 11 along 12—12.
Figure 13:
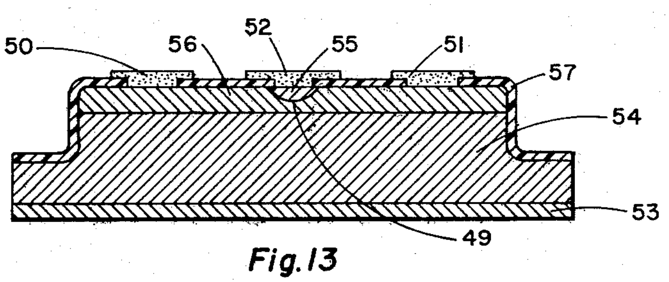
FIG. 13 shows a sectional view of FIG. 11 along 13—13.

FIG. 11 shows an isometric view of a device similar to the two channel device just described except that it is shown adapted as for a three contact relay. It therefore has three channels. FIG. 12 is a sectional view of the device of FIG. 11 along 12—12 and FIG. 13 is a section along 13—13. Each mesa-like structure 48 has a separate channel 49. The source 50 and drain 51 terminals are at the top at the ends of each mesa. One gate terminal 52 is in the center. The terminal 53 of the other gate, which is common to all three structures is on the bottom of the die itself. The P material 54 of the die makes the other gate junctions with the three channels. The three upper gate regions 55 are P-type diffused and the N material 56 is epitaxially formed. All junctions are covered by a protective film 57 of silicon dioxide or glass. The characteristic three mesa shaped of the device was formed by etching. The terminals 50, 51, 52 and 53 are of aluminum. Aluminum contacts to N material must be made in such a manner that a PN junction is not formed and there are well-known techniques for preventing this including heavily doping the N region at the point of contact so that if alloyed, the regrowth after alloying is still N-type, or not alloying thus taking advantage of the fact that evaporated aluminum contacts are very adherent even if not alloyed. A separate current limiting resistor (not shown) of an adequately high value is connected to each upper gate terminal for protection of the device and because if punchthrough occurs at one channel slightly in advance of the other channels, the voltage to the gates of the other channels would otherwise fall to such a low value that the channels would open up again.

In general the ratio of channel length to channel width for best operation is less than 2:1. In workable embodiments of the devices shown just the ordinary well-known semiconductor processes are used such as solid state diffusion, epitaxial crystal growing, and high vacuum metallizing. A suitable channel is 5 microns long by 3 microns thick and the 5 microns thick N-type epitaxial region in which the channel is formed has a resistivity of about 1 ohm-centimeter. The shallow upper diffusion forms a P region about 2 microns deep. The resistivity of the large P region of the die is about .5 ohm-centimeter. The devices shown in FIGS. 6, 7, 8, 9, 11, 12 and 13 are about 100 times actual size.

When any of the described devices are employed as indicated, the degree of isolation between input and output signals is very good. For an applied voltage less than punchthrough across the gate terminals of the device, and with just a current meter across the source and drain terminals, the current flow through the meter will only be some tiny fraction of the junction leakage current. It is apparent that the invention provides a simple semiconducting isolation device suitable for substitution in many cases for relays and transformers in miniature circuits. Such devices may be expected to have the long operating lifetimes associated with conventional semiconductor devices such as diodes and transistors and may be made by well-known techniques. They are simpler and less expensive to manufacture for the previously discussed relay applications than are transistors suitable for performing the same function and are smaller and less expensive than miniature transformers.

I claim:

1. An isolation device including in combination a semiconductor tetrode comprised of a body of semiconductor material having a constricted region of one conductivity type within said body and two opposed regions of the opposite conductivity type forming junctions on opposite sides of said constricted region, separate gate contacts to said opposed regions, input circuit means connected to said gate contacts and including a signal source for applying input signal voltages between said gate contacts, connections to said constricted region, and output circuit means connected to said connections and including a current source for supplying current through said constricted region which current is a function of the potential difference applied to said contacts as well as the potential applied to said connections, said input circuit means and said output circuit means having no mutual connection and so being isolated from each other.

2. An isolation device including in combination a body of semiconductor material having a constricted region of one conductivity type therein and having two opposed regions of the opposite conductivity type forming junctions on opposite sides of said constricted region, said opposed regions having separate contacts, and said constricted region having connections thereto, means applying voltage to said connections for producing current through said constricted region, and means applying to said contacts a voltage not less than the punchthrough voltage of said device to close said constricted region and thereby interrupt the current therein.

3. An isolation device including in combination a body of semiconductor material having a constricted region of one conductivity type therein and having two opposed regions of the opposite conductivity type forming junctions on opposite sides of said constricted region, said opposed regions having separate contacts, and said constricted region having connections thereto, current limiting means connected to one of said opposed regions, means applying voltage to said connections for producing current through said constricted region, and means applying to said contacts a voltage not less than the punchthrough voltage of said device to close said constricted region and thereby interrupt the current therein.

4. An isolation device comprising a semiconductor body having a constricted region of one conductivity type material of high resistivity, and having two opposed regions of the opposite conductivity type material of low resistivity which form junctions with said constricted region, separate contacts to said opposed regions, an input circuit connected to said contacts for establishing different potentials at said contacts to bias one of said junctions in the forward direction and the other of said junctions in the reverse direction so that current flow due to the applied potential is the leakage current of the reverse-biased junctions and a comparatively large depletion region is formed at the reverse-biased junction which controls the resistance of said constricted region, connections to said constricted region, and an output circuit connected to said connections and having no connection to said input circuit so that said input and output circuits are isolated from each other, said output circuit including means for supplying current through said constricted region which current is a function of the potential difference applied to said contacts as well as the potential applied to said connections.

5. A multi-channel isolation device including a body of semiconductor material having a plurality of constricted regions of one conductivity type therein, each of said constricted regions having gate junctions on opposite sides thereof formed by material of the opposite conductivity type, a region of opposite conductivity type separating said constricted regions, a contact to said opposite conductivity region, separate gate contacts to said body which are individual to the junctions on the opposite side of said constricted regions, and connections to each of said constricted regions, and means for supplying current through said constricted regions which current is a function of the potential difference applied to said contacts as well as the potential applied to said connections.

6. An isolation device including a semiconductor body having a constricted region of one conductivity type therein with two junctions on opposite sides of said constricted region formed by semiconductor material of the opposite conductivity type, means for supplying current through said constricted region, and voltage supplying means for applying different potentials to the material on opposite sides of said constricted region for controlling current in said constricted region, said constricted region having a length not greater than twice the separation of said junctions in order to minimize the effect of current in said constricted region on the potential difference across said junctions, the current supplied through said constricted region being a function of the potential difference applied to opposite sides of said constricted region as well as the potential applied through said constricted region.

7. An isolation device including a semiconductor body having a constricted region therein of relatively high resistivity material of one conductivity type, said body further having two regions of opposite conductivity type relatively low resistivity material on opposite sides of said constricted region forming PN junctions with said constricted region, separate gate contacts to said opposed regions, connections to said constricted region, an output circuit connected to said connections including means for supplying current through said constricted region, an input circuit connected to said gate contacts including means to apply different potentials to said gate contacts to bias one of said junctions in the forward sense and the other of said junctions in the reverse sense for controlling current in said constricted region, said constricted region having a length not greater than twice the separation of said junctions in order to minimize the effect of constricted region current on the gate junction potential difference and thereby increase the isolation between said input and output circuits.

References Cited by the Examiner

UNITED STATES PATENTS

| | | | |
|---|---|---|---|
| 2,744,970 | 5/1956 | Shockley | 317—235 X |
| 2,869,055 | 1/1959 | Noyce | 317—235 |
| 2,897,295 | 7/1959 | Zelinka | 317—235 X |
| 2,921,265 | 1/1960 | Teszner | 330—38 |
| 2,984,752 | 5/1961 | Giacoletto | 307—88.5 |
| 3,017,519 | 1/1962 | Dill | 307—88.5 |
| 3,038,085 | 6/1962 | Wallmark et al. | 307—88.5 |
| 3,049,677 | 8/1962 | Wolfendale | 331—111 |

JOHN W. HUCKERT, *Primary Examiner.*

R. SANDLER, *Assistant Examiner.*